United States Patent [19]
Reuter et al.

[11] Patent Number: 6,145,943
[45] Date of Patent: Nov. 14, 2000

[54] SWITCHING CABINET WITH AN ASSEMBLY PLATE

[75] Inventors: Wolfgang Reuter, Burbach; Paul Root, Bad Endbach, both of Germany

[73] Assignee: Rittal-Werk Rudolf Loh GmbH & Co. KG, Herborn, Germany

[21] Appl. No.: 09/308,089

[22] PCT Filed: Nov. 6, 1997

[86] PCT No.: PCT/EP97/06145

§ 371 Date: May 17, 1999

§ 102(e) Date: May 17, 1999

[87] PCT Pub. No.: WO98/23138

PCT Pub. Date: May 28, 1998

[30] Foreign Application Priority Data

Nov. 19, 1996 [DE] Germany .......................... 196 47 822
Aug. 29, 1997 [DE] Germany .......................... 197 37 673

[51] Int. Cl.[7] .................................................. A47B 81/06
[52] U.S. Cl. .................... 312/223.1; 361/605; 312/265.6
[58] Field of Search .............................. 312/330.1, 227.1, 312/334.36, 334.27, 348.1; 211/26, 189, 180, 191, 192; 361/605

[56] References Cited

U.S. PATENT DOCUMENTS 4,689,722 8/1987 Debus et al. .
5,333,950 8/1994 Zachrai ................................ 312/265.4

FOREIGN PATENT DOCUMENTS

41 40 072   6/1993   Germany .
43 12 487  10/1994   Germany .
195 11 639 10/1996   Germany .
2 160 765   1/1986   United Kingdom .

Primary Examiner—Peter M. Cuomo
Assistant Examiner—Jerry A. Anderson
Attorney, Agent, or Firm—Pauley Petersen Kinne & Fejer

[57] ABSTRACT

A switching cabinet which is enclosed by wall elements and a door. An assembly plate is placed parallel to a vertical side wall. The assembly plate can be moved in a direction of the associated side wall by sliders on at least one guide rail and brought into a position for mounting. Limited mounting opportunities, because of the guide rails, are thus avoided by designing the guide rails as a separate part, by providing positioning units which are detachably secured to the switching cabinet, and by being able to remove the guide rails from the cabinet after the assembly plate is positioned.

24 Claims, 5 Drawing Sheets

SWITCHING CABINET WITH AN ASSEMBLY PLATE

BACKGROUND OF THE INVENTION

1. Field of the Invention

This invention relates to a switchgear cabinet, which can be closed by wall elements and a cabinet door, wherein an assembly plate is arranged parallel with a vertical lateral wall, and which can be displaced on at least one guide rail in the direction toward the associated lateral wall using sliders and can be brought into a mounting position.

2. Description of Prior Art

Such a switchgear cabinet is known, for example, from German Patent Reference DE 41 40 072 A1. Such switchgear cabinets have a rack which is assembled from vertical and horizontal frame legs. The two lower horizontal frame legs, which extend in the direction of the depth of the switchgear cabinet, are formed by a multi-beveled sheet metal blank. In the open hollow profile produced in this manner, a strip with a longitudinal edge is created, on which the slider is placed with a slit-shaped receiver. Thus the assembly plate can be displaced on its sliders in the direction toward the lateral wall, for example the rear wall located opposite the cabinet door, until it reaches a mounting position.

The strips with the longitudinal edges are sometimes considered to be interfering, since for certain installations they make the attachment on the horizontal frame legs more difficult. A similar assembly plate fastening is also known from German Patent Reference DE 43 12 487.

SUMMARY OF THE INVENTION

It is one object of this invention to create a switchgear cabinet of the type mentioned at the outset, with unlimited possibilities for add-ons on the frame legs because of guide rails.

This object of this invention is attained with a guide rail designed as a separate element and releasably fastened on the switchgear cabinet using positioning units. After positioning the assembly plate, the guide rail can be removed from the switchgear cabinet. Thus, the guide rails can be produced as separate structural elements. The guide rails are fixed in place using the positioning units before the assembly plate is inserted into the switchgear cabinet. The assembly plate can subsequently be pushed in and fixed in an intended position. Thereafter the guide rails can be easily removed again from the switchgear cabinet, so that the guide rails do not present an obstacle.

Advantageously, two guide rails are fixed at a distance from each other in the interior of the switchgear cabinet, in order to guide the assembly plate in a manner which is secure against tilting. However, a single or more than two guide rails can also be inserted.

In accordance with an advantageous embodiment of this invention, the positioning units are fixed in place in retainers in the frame legs of a rack. Thus a stationary and direct attachment on the switchgear cabinet is possible. The rack has sufficient strength for supporting equipped, and therefore heavy, assembly plates.

In accordance with a preferred embodiment of this invention, the rack has horizontal and vertical frame legs, wherein the horizontal frame legs form a bottom and a cover frame, and the retainers for the positioning units are formed by rows of fastening retainers, which are cut in the longitudinal direction into the horizontal frame legs. Thus the fastening retainers, which are normally used for the attachment of built-ins, can also be used for the guide rails.

The guide rail can be produced simply and with little costs if the guide rail is formed in the shape of a U-profile by a center section and two legs connected therewith, which are parallel and spaced apart, and if the center section has a sliding section for the slider. Thus, the guide rail is inserted into the switchgear cabinet so that the two strips point downward. The center section then forms a level sliding surface for the slider. A high moment of resistance is created in the guide rail by the two strips. Even very heavy assembly plates can be displaced on the guide rail because of these simple steps.

If two bolts are used per positioning unit, which are provided with a chamfered insertion piece, then assured fixing of the guide rail is possible. By using respectively two bolts per positioning unit, the degrees of freedom for the movement of the guide rail can be limited to displacement only in the direction of the height of the switchgear cabinet.

To assure simple manipulation, a handle is connected to the guide rail which projects past the front of the switchgear cabinet and which can be closed by the cabinet door, and the sliding section is continued on the handle. Thus, the guide rail can be easily inserted into the switchgear cabinet using the handle, and can be removed again from it after mounting is terminated. Because the sliding section is also continued on the handle, it is possible to place the assembly plate on the guide rail which is outside of the switchgear cabinet. This makes the placement of the assembly plate on the guide rail considerably easier.

For positively guiding the assembly plate on the guide rails, the slider has a seating surface with which it is guided on the sliding section of the guide rails, and one or several guides are arranged on the slider, which maintain the slider on the sliding section.

A switchgear cabinet in accordance with this invention is distinguished because a holding element with a plug-in shoulder is connected to the slider, which is introduced into a correspondingly designed plug retainer of the assembly plate. The holding element can be fixed in place on a fastening means which is connected with the switchgear cabinet.

For fixing the assembly plate in place, a holding element with a plug-in shoulder is connected to the slider, which is introduced into a designed plug retainer of the assembly plate. The holding element can be fixed in place on a fastening means which is connected with the switchgear cabinet. Thus, the assembly plate can be initially put into position using the slider. Subsequently the holding element is put into operational contact with the fastening means of switchgear cabinet. Then the guide rails are removed again from the interior of the switchgear cabinet. Because the holding element is inserted by means of a plug-in shoulder into a special plug retainer of the assembly plate, a simple and rapid mounting of the slider is achieved for one, and an exact alignment of the sliding surface of the slider also takes place.

So that the guide rails can be simply dismounted again after the switchgear cabinet is equipped with the assembly plate, in the mounted state of the assembly plate the assembly plate is maintained on the fastening means at a vertical distance from the guide rail.

The guide rail can also be fixed in place on adjoining racks for securing during transport. After transport, the strut can be dismounted from the vertical frame legs. It can then be used for introducing an assembly plate into the interior of the switchgear cabinet. Built-in units can be fastened on the wall facing into the interior of the switchgear cabinet. The guide rail can then also be used as a mounting rail.

In accordance with a preferred embodiment of this invention, the wall has at least one row of fastening retainers spaced apart from each other at even distances, on which electrical built-in units can be fastened. Besides its additional function as a mounting aid for the assembly plate, a guide rail designed in this way can also be used as a mounting chassis. In this case the electrical built-in units can be attached to the vertical frame legs.

The guide rail can be aligned and prepositioned on the rack using the positioning units.

A possible variation of this invention is distinguished by two legs that are bent away from the broad side of the sliding section of the guide rail which terminate on one end in at least one fixation shoulder. The fixation shoulder has a screw retainer, by means of which it can be screwed to the vertical frame leg, or respectively the horizontal frame leg.

In this case the projection of the support sections past the sliding section can be selected so that the sliding section is arranged in the mounting plane formed by the profile sides. When used as a sliding rail, the bevels can be used as detents with which the displacement movement of the assembly plate can be limited. The support sections offer a solid connecting possibility for the guide rail. This allows the secure guidance of those assembly plates which are equipped with heavy attachments.

To achieve rapid and simple positioning of the guide rail, at least one of the support sections has positioning units. If the guide rail is used as sliding guide for the assembly plate, fixation in place on the positioning units alone is sufficient. Additional fastening, for example a screw connection, is not required, since the transverse displacement of the guide rail is prevented by the positioning units.

To assure a secure fastening of the guide rail, the vertical profile legs and the horizontal profile legs respectively have at least two first and second profile sides facing the interior of the rack and extending at right angles to each other, wherein the first profile sides extend at right angles to the associated side of the rack, and the second profile sides extend parallel with it. The guide rail is inserted on the one side into the first profile side with the second positioning unit, and is fastened with the other end on the second profile side of the respectively associated vertical frame leg or the horizontal frame leg.

BRIEF DESCRIPTION OF THE DRAWINGS

This invention will be explained in greater detail in light of exemplary embodiments represented in the drawings wherein.

DESCRIPTION OF PREFERRED EMBODIMENTS

Figure 1:
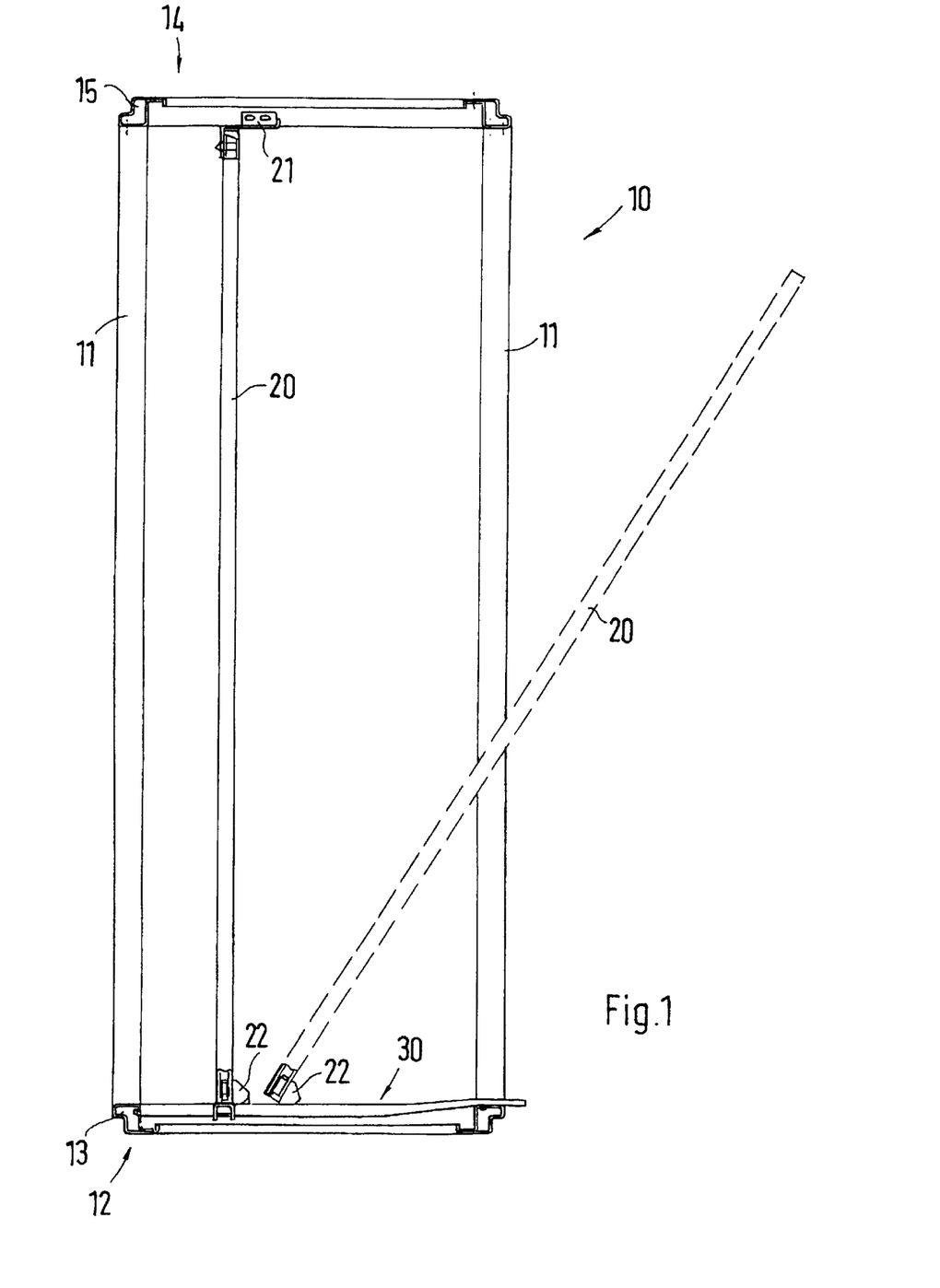
FIG. 1 is a side view of a rack of a switchgear cabinet with an assembly plate in a lateral view.

FIG. 1 shows a rack 10 of a switchgear cabinet. The rack 10 is assembled from vertical and horizontal frame legs 11, 13 and 15. The horizontal frame legs 13, 15 respectively form a closed bottom or cover frame 12, or respectively 14. An assembly plate 20 can be inserted into the interior of the switchgear cabinet. In the present example, the assembly plate 20 is pushed into the interior space formed by the rack 10 through the open front of the switchgear cabinet. The front of the switchgear cabinet can be closed by means of a cabinet door, which is not shown in FIG. 1, for reasons of clarity. Guide rails 30 are used for inserting the assembly plate 20 into the switchgear cabinet. Viewed from the front of the switchgear cabinet, the guide rails 30 are inserted into the left and right lower lateral areas of the bottom frame 12. Sliders 22, which are connected with the assembly plate 20, can be displaced on the guide rails 30. In the mounted position, the assembly plate 20 extends vertically. The insertion of the assembly plate 20 into the switchgear cabinet is schematically indicated by the dashed representation of the assembly plate 20. The vertical assembly plate 20 is fastened on the top on the cover frame 14 by means of a holder 21.

To explain the functioning of the guide rails 30, reference is made in the following text describing FIGS. 2 to 3c.

Figure 2:
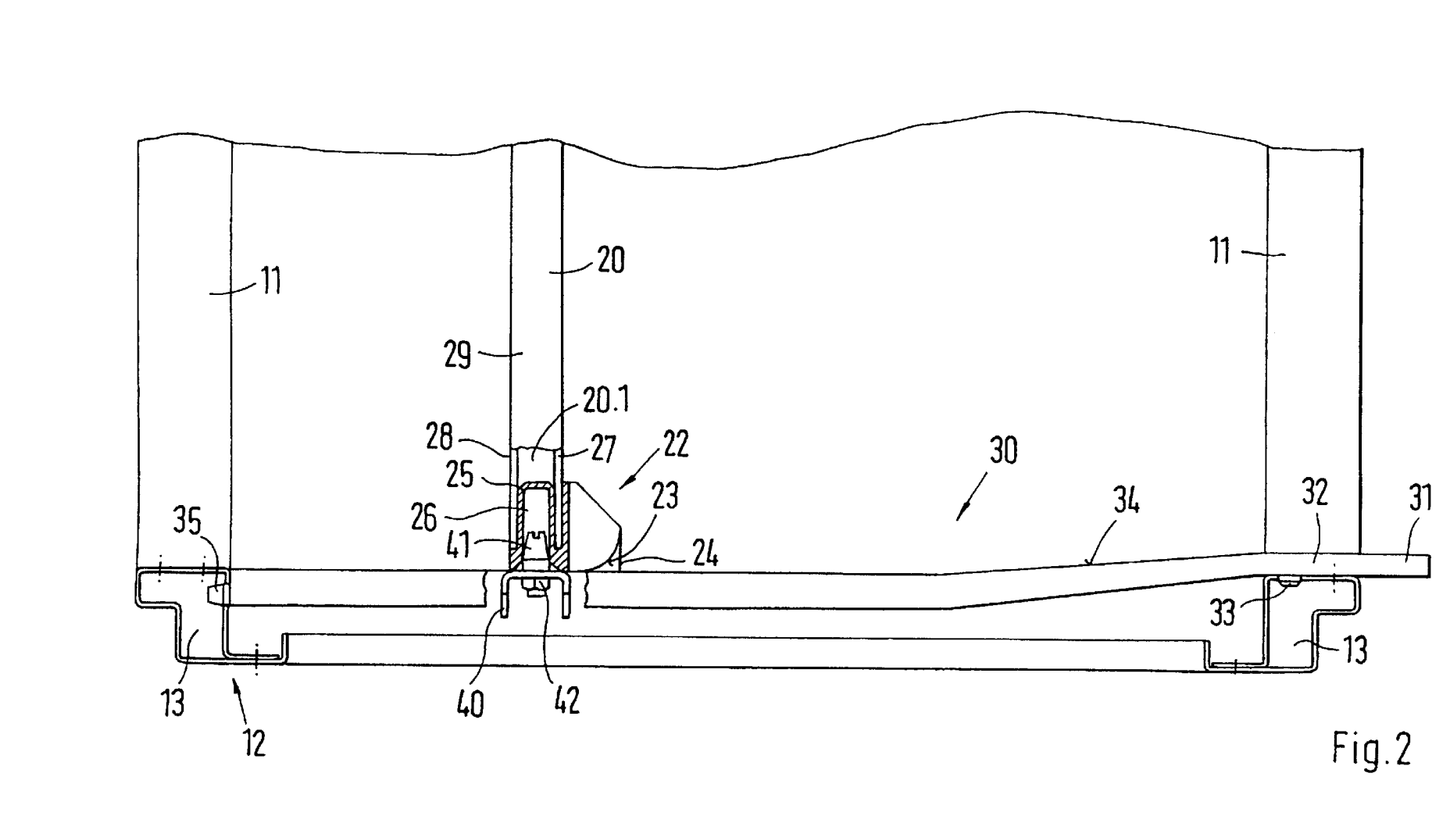
FIG. 2 is an enlarged partial sectional view of a lower area of the rack.

As can be seen in FIG. 2, the guide rail 30 has a handle 31 which projects past the open front of the switchgear cabinet. A support section 32, which is supported on the horizontal frame leg 13 extending perpendicular with respect to the drawing plane, is connected to the handle 31. A positioning unit 33 is attached to the support section 32. The positioning unit 33 comprises two bolts, which are inserted in retainers of the horizontal frame leg 13. The retainers are formed by rows of fastening retainers extending in the longitudinal direction of the horizontal frame legs 13. The rows of fastening retainers are cut into both profile sides facing the interior of the switchgear cabinet.

A second positioning unit 35 is arranged at the end of the guide rail 30 remote from the handle 31. This positioning unit 35 also comprises two bolts. The bolts are inserted into the retainers formed by rows of fastening retainers. The guide rail 30 is fixed in place by means of the positioning device 33 and 35 in such a way that the guide rail 30 can only be lifted upward by the handle 31. A lateral displacement or twisting of the guide rail 30 is impossible.

Figure 3A:
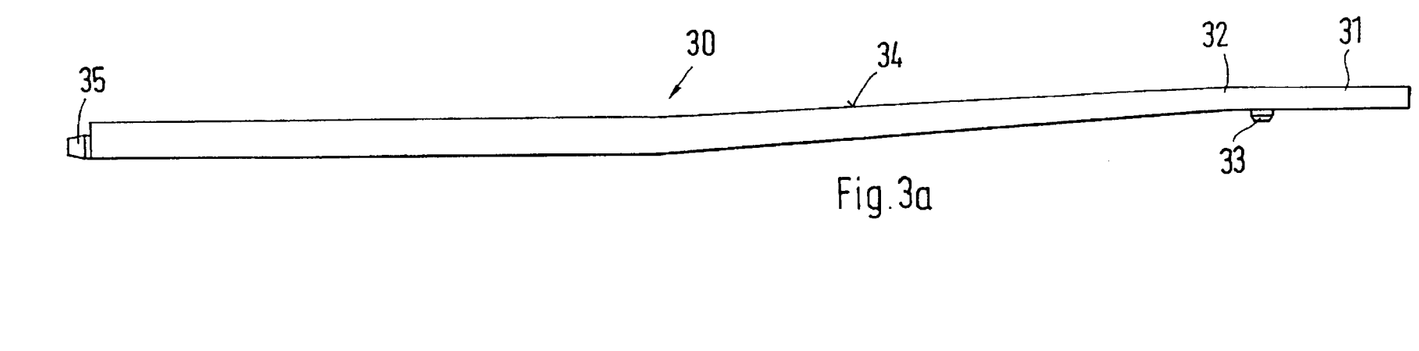
FIGS. 3a to 3c are different views of a guide rail shown in FIGS. 1 and 2.
Figure 3B:
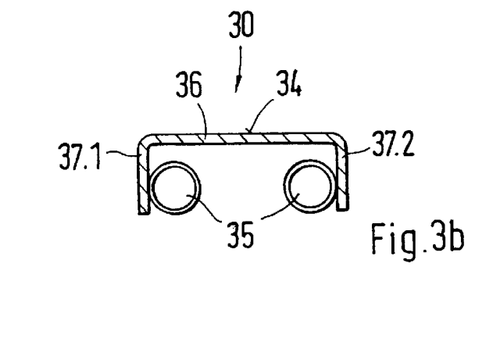
Figure 3C:
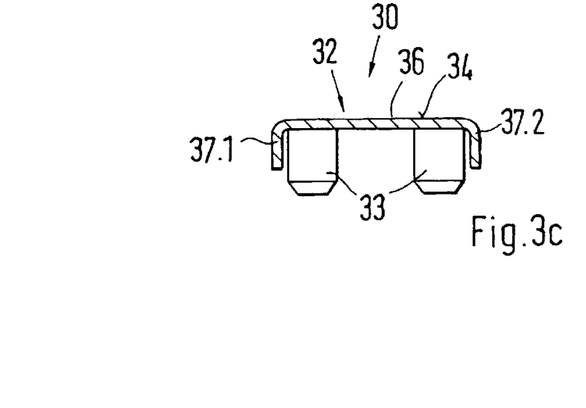

The details of the design of the guide rail 30 are shown more particularly in FIGS. 3a to 3c. FIG. 3a represents a side view, such as shown in FIGS. 1 and 2. FIG. 3b shows a front view of the left side of the guide rail 30. As shown, the guide rail 30 is formed in a U-shape from a center section 36 and two adjoining legs 37.1, 37.2, which are parallel and spaced apart from each other. The bolts forming the positioning unit 35 are placed against the two legs 37.1, 37.2 and are fastened on them.

FIG. 3c shows a top view of the right side of the guide rail 30. As shown, the two bolts forming the positioning unit 33 are fastened on the underside of the support section 32. The bolts are welded to the center section 36 for this purpose.

As further shown in FIG. 2, a holding element 22 is connected to the slider 23. The holding element 22 has a plug-in shoulder 25, which is inserted into a correspondingly embodied plug retainer 20.1 of the assembly plate 20. To this end, the assembly plate 20 has a front plate 27, which has a backward bent angled piece 29. A strip 28 is bent off from the angled piece 29 at right angles parallel with the plate 27. The plug retainer 20.1 for the plug-in shoulder 25 is formed between the plate 27, the angled piece 29 and the strip 28. The plug-in shoulder 25 is embodied to be hollow, to form a retainer 26. The retainer 26 is used for fixing the assembly plate 20 in place on the rack 10. Fastening means 41, in the present case designed as a chamfered bolt, engage the retainer 26, which is open only toward the bottom. The fastening means 41 are fixed in place by means of a screw connection 42 on a transverse strut 40. The transverse strut 40 extends in the direction of the width of the switchgear cabinet.

For inserting the assembly plate 20 into the interior of the switchgear cabinet, the assembly plate 20 is initially placed with the slider 23 on the handle 31 outside of the switchgear cabinet. Thereafter, the assembly plate 20 can be placed into an inclined position, which is made possible by the arched contour of the slider 23. The assembly plate 20 can now be pushed through the open front into the switchgear cabinet. In the process, the slider 23 slides on the sliding section 34. For preventing the slider 23 from laterally sliding off the guide rail 30, guides 24 are used. The guides 24 are connected to the holding element 22.

Once the assembly plate 20 reaches its destination, it can be placed upright. In the process, the fastening element 41 enters into the retainer 26. The transverse strut 40 is inserted into the switchgear cabinet slightly higher than the guide rail 30. Because of this, a vertical space between the lower end of the assembly plate and the guide rail 30 results when the assembly plate 20 is placed upright. Therefore the guide rail 30 is easily removed from the interior of the switchgear cabinet. It is only necessary to lift the guide rail 30 by the handle 31, so that the bolts of the positioning unit 33 are lifted out of the retainers 26. Thereafter, the guide rail 30 can be pulled through the open front out of the switchgear cabinet. In the process, the bolts of the second positioning unit 35 move out of the corresponding retainers 26. For final fixation in place, the mounting plate 20 is secured to the holder 21, as shown in FIG. 1.

In the present case, the guide rail 30 is preferably made from a stamped and bent element. In order to achieve good sliding capabilities, the slider 23 is preferably made of a plastic material. The slider 23 can be manufactured, together with the holding element 21 and the plug-in shoulder 25, as plastic injection molded elements.

Figure 4:
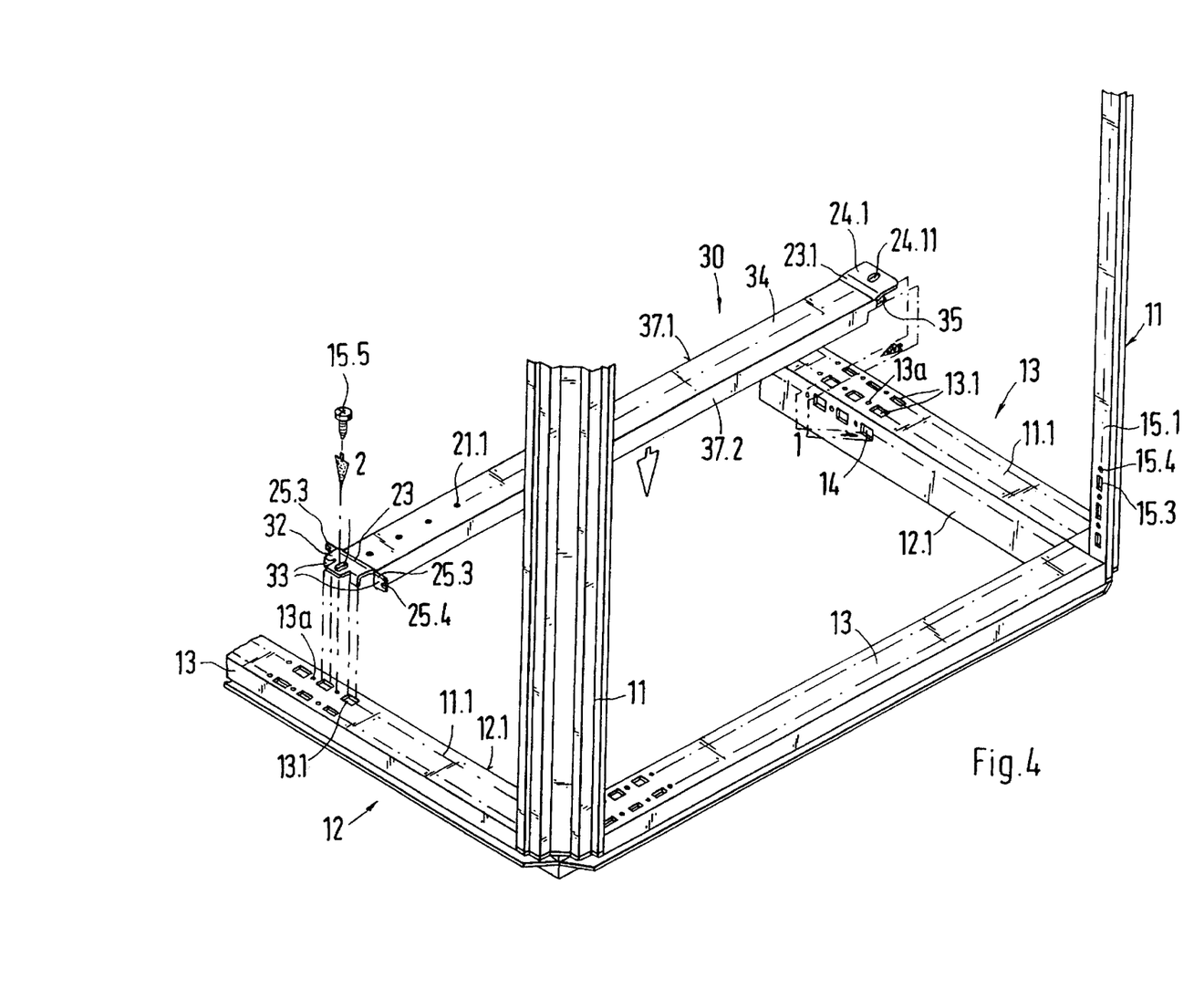
FIG. 4 is a partial perspective view of a further embodiment of a rack with a guide rail.

A portion of the rack, assembled from frame legs, is shown in FIG. 4. In this case the horizontal frame legs 13 are designed as width and depth struts. The width struts and the depth struts form a bottom frame 12, to the corner areas of which the vertical frame legs 11 are connected. The width struts and the depth struts are structurally alike and have two profile sides 11.1, 12.1, facing the interior of the rack, which extend at right angles to each other. In this case, the first profile side 11.1 extends at right angles relative to the facing lateral wall of the rack. The second profile side 12.1 extends parallel with the lateral wall. Rows of fastening retainers 13.1, 14, which are evenly spaced apart, are cut into the profile sides 11.1, 12.1. Here, the first profile side 11.1 has two rows of fastening retainers 13.1, 14. But the second profile side 12.1 has only one row. Bores 13a are cut into the profile sides 11.1, 12.1 between the individual fastening retainers 13.1, 14.

Figure 5:
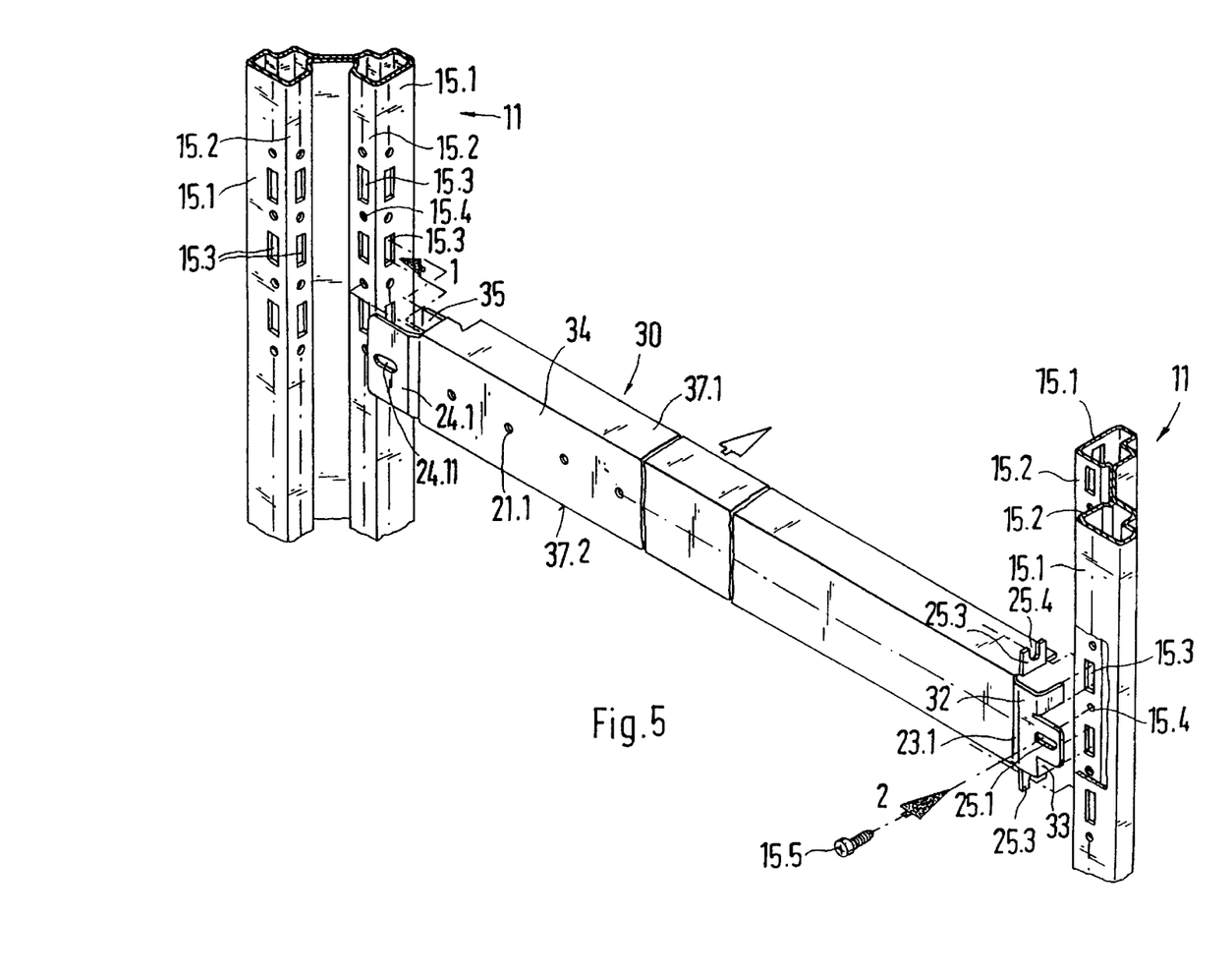
FIG. 5 is a partial perspective view of two vertical frame legs of the rack shown in FIG. 4, with the guide rail which can be mounted thereon.

The vertical frame legs 11 each have four profile sides 15.1, 15.2. The arrangement of the profile sides 15.1, 15.2 are shown in greater detail in FIG. 5. As shown from this representation, two first profile sides 15.1 respectively extend perpendicularly with respect to the associated sides of the rack. The second profile sides 15.2 adjoin the first profile sides 15.1 at right angles. Each of the profile sides 15.1, 15.2 respectively has a row of fastening retainers 15.3. Bores 15.4 are also arranged between them.

Making reference to FIG. 4, the design of a guide rail 30, which is fastened on the width struts located opposite each other, is explained in greater detail. The guide rail 30 has a sliding section 34 with a row of fastening retainers 21.1. The sliding section 34 respectively has a bevel 23.1 on its longitudinal ends. The bevel 23.1 extends transversely to the longitudinal extension of the guide rail 30. The bevel 23.1 has a support section. In this case, the bevel 23.1 maintains the support section 24.1, 32 above the level constituted by the sliding section 34. The support sections 24.1, 32 each have an elongated hole 24.11, 25.1. Two positioning units 33 embodied as plug-in shoulders are stamped out of the front support section 32 and are bent downward at right angles.

Two legs 37.1, 37.2 are bent downward out of the broad sides of the sliding section 34 of the guide rail 30. On an end facing the support section 32, the legs 37.1, 37.2 have fixating shoulders 25.3. The fixating shoulders 25.3 are bent off at right angles away from the lateral legs 22 and have a screw retainer 25.4.

A tab is cut off the end facing the support section 24.1 and is bent inward. The tab forms the positioning unit 35, 24.3.

The guide rail 30 can be used as a mounting aid for an assembly plate. To this end, the guide rail 30 is fastened on the width struts 10.1 which extend parallel in relation to each other. For fastening, first the positioning unit 35 of the guide rail 30 is inserted into one of the fastening retainers 14 of the profile side 12.1 of the rear width strut, in a first mounting step. Since the inside width of the fastening retainer 14 is greater than the thickness of the material of the positioning unit 35, it is possible to offset it vertically in the fastening retainer 14. This makes the attachment of the guide rail 30 to the width strut easier. When the positioning unit 35 is pushed downward in the fastening retainer 14, the support section 24.1 rests on the first profile side 11.1. In this case the elongated hole 24.11 in the support section 24.1 is aligned with one of the bores 13a.

The guide rail 30 can be tilted down thereafter, wherein the positioning unit 33 engages fastening retainers 13.1 of the first profile side 11.1 of the front width strut. The tilt-down movement of the guide rail 30 is limited by the support section 32, which rests on the profile side 11.1. The inside width of the opening of the fastening retainer 13.1 transversely with respect to the longitudinal extent of the width strut 10.1 is selected to be greater than the thickness of the material of the positioning unit 33. Therefore the guide rail 30 can be limitidly displaced in relation to its longitudinal axis. Because of this step, a simple and rapid mounting is possible. It is furthermore possible to compensate for manufacturing tolerances. The guide rail 30 mounted in this way can be further secured with a fastening element 15.5. The fastening element 15.5 is designed as a tapping screw, which is inserted into the elongated hole 25.1 and screwed into the bore 13a.

An assembly plate can be displaced in the direction of the depth of the switchgear cabinet on the sliding section 34. In this case the displacement movement can be limited by the bevels 23.1.

In its second function, the guide rail 30 can also be used as a securing element during transport. To this end it is screwed to two adjoining vertical frame profiles 11. This installation situation can be seen in detail in FIG. 5. As shown, first the guide rail 30 is inserted with its positioning units 35 into two adjoining fastening retainers 15.3 of the profile side 15.1 of the rear vertical frame profile 11. Thereafter, the support section 32 can be placed on the profile side 15.2 of the front vertical frame profile 11. For securing the guide rail 30, the fastening element 15.5 is screwed into the bore 15.4. Further securing of the guide rail 30 can take place via the elongated hole 24.11 of the support flange 24.1. It is also possible to provide a screwed connection with the front vertical frame profile 11 via the screw retainers 25.4 of the fixating shoulders 25.3. A further function of the guide rail 30 results in connection with the fastening retainers 21.1 cut into the sliding section 34. The guide rail 30 can be used as a mounting chassis, to which electrical built-in units can be attached and maintained in the interior of the rack.

When using the guide 30 as mounting aid for the assembly plate, its orientation can be selected in such a way, that the assembly plate can be displaced either perpendicularly in relation to the rear wall of the rack or parallel therewith.

What is claimed is:

1. In a switchgear cabinet, which can be closed by wall elements and a cabinet door, wherein an assembly plate is arranged parallel with a vertical lateral wall, which can be displaced on at least one guide rail in a direction toward an associated lateral wall using sliders and can be brought into a mounting position, the improvement comprising:

a guide rail (30) designed as a separate element and releasably fastened on the switchgear cabinet by positioning units (33, 35), and after the assembly plate (10) is positioned the guide rail (30) can be removed from the switchgear cabinet.

2. In the switchgear cabinet in accordance with claim 1, wherein one of the positioning units (33) is fixed in place in one of a plurality of retainers in a plurality of frame legs (11, 13) of a rack.

3. In the switchgear cabinet in accordance with claim 2, wherein the rack has horizontal and vertical frame legs (11, 13, 15), wherein the horizontal frame legs (13, 15) form a bottom and a cover frame (12 and 14), and the retainers for the positioning units (33, 35) are formed by rows of fastening retainers, which are cut in a longitudinal direction into the horizontal frame legs (13, 15).

4. In the switchgear cabinet in accordance with claim 3, wherein the guide rail (30) is formed in a shape of a U-profile by a center section (36) and two legs (37.1, 37.2) connected with the center section (30), which are parallel and spaced apart, and the center section (36) has a sliding section (34) for a slider (23).

5. In the switchgear cabinet in accordance with claim 4, wherein two bolts are used per each of the positioning units (33, 35) which have a chamfered insertion piece.

6. In the switchgear cabinet in accordance with claim 5, wherein a handle (31) is connected to the guide rail (30) which projects past a front of the switchgear cabinet.

7. In the switchgear cabinet in accordance with claim 6, wherein the slider (23) has a seating surface on which the slider (23) is guided on the sliding section (34) of the guide rail (30), and at least one of a plurality of guides (24) are arranged on the slider (23), which maintain the slider (23) on the sliding section.

8. In the switchgear cabinet in accordance with claim 7, wherein a holding element (22) with a plug-in shoulder (25) is connected to the slider (23), which is introduced into a correspondingly designed plug retainer (20.1) of the assembly plate (20), and the holding element (22) is fixed in place on fastening means (41) connected with the switchgear cabinet.

9. In the switchgear cabinet in accordance with claim 8, wherein in a mounted state of the assembly plate (20) the assembly plate (20) is maintained on the fastening means (41) at a vertical distance from the guide rail (30).

10. In the switchgear cabinet in accordance with claim 9, wherein the guide rail (30) is fastened to fastening receivers (15.3) of adjoining vertical frame legs (11) for the purpose of transport security, and the guide rail (30) has a wall facing an interior of the switchgear cabinet.

11. In the switchgear cabinet in accordance with claim 10, wherein the wall has at least one row of fastening retainers (21.1) spaced apart from each other at even distances on which a plurality of electrical built-in units are fastened.

12. In the switchgear cabinet in accordance with claim 11, wherein the two legs (37.1, 37.2) are bent away from a broad side of the sliding section (34) of the guide rail (30), which terminate on one end in at least one fixation shoulder (25.3), and the at least one fixation shoulder (25.3) has a screw retainer (25.4).

13. In the switchgear cabinet in accordance with claim 12, wherein the sliding section (34) has one of a plurality of bevels (23.1) on each of opposing longitudinal ends, which extend transversely with respect to the longitudinal direction of the guide rail (30) and project past a level formed by the sliding section (34), and a plurality of support sections (32) follow the bevels (23.1) which rest against a plurality of profile sides (15.1, 15.2) of one of the associated vertical frame legs (11) and the horizontal frame legs (13).

14. In the switchgear cabinet in accordance with claim 13, wherein at least one of the support sections (32) has a plurality of positioning units (33, 35).

15. In the switchgear cabinet in accordance with claim 14, wherein the vertical frame legs (11) and the horizontal frame legs (13) respectively have at least two first and second profile sides (15.1, 15.2 and 11.1, 12.1) facing a rack interior of the rack and extending at right angles to each other, wherein the first profile sides (15.1, 11.1) extend at right angles to an associated side of the rack, and the second profile sides (15.2, 12.2) extend parallel with the rack, and the guide rail (30) is inserted on one side into one of the first profile sides (15.1, 11.1) with the second positioning unit (35), and is fastened with an other end on one of the second profile sides (15.2, 12.1) of one of the associated vertical frame leg (11) and the horizontal frame leg (13).

16. In the switchgear cabinet in accordance with claim 1, wherein the guide rail (30) is formed in a shape of a U-profile by a center section (36) and two legs (37.1, 37.2) connected with a center section (36), which are parallel and spaced apart, and the center section (36) has a sliding section (34) for a slider (23).

17. In the switchgear cabinet in accordance with claim 1, wherein a handle (31) is connected to the guide rail (30) which projects past a front of the switchgear cabinet.

18. In the switchgear cabinet in accordance with claim 1, wherein a slider (23) has a seating surface on which the slider (23) is guided on a sliding section (34) of the guide rail (30), and at least one of a plurality of guides (24) are arranged on the slider (23), which maintain the slider (23) on the sliding section.

19. In the switchgear cabinet in accordance with claim 1, wherein a holding element (22) with a plug-in shoulder (25) is connected to a slider (23), which is introduced into a correspondingly designed plug retainer (20.1) of the assembly plate (20), and the holding element (22) is fixed in place on fastening means (41) connected with the switchgear cabinet.

20. In the switchgear cabinet in accordance with claim 1, wherein the guide rail (30) is fastened to fastening receivers (15.3) of adjoining vertical frame legs (11) for the purpose of transport security, and the guide rail (30) has a wall facing an interior of the switchgear cabinet.

21. In the switchgear cabinet in accordance with claim 1, wherein the guide rail (30) has at least one row of fastening retainers (21.1) spaced apart from each other at even distances on which a plurality of electrical built-in units are fastened.

22. In the switchgear cabinet in accordance with claim 1, wherein two legs (37.1, 37.2) are bent away from a broad side of a sliding section (34) of the guide rail (30), which terminate on one end in at least one fixation shoulder (25.3), and the at least one fixation shoulder (25.3) has a screw retainer (25.4).

23. In the switchgear cabinet in accordance with claim 1, wherein a sliding section (34) has one of a plurality of bevels (23.1) on each of opposing longitudinal ends, which extend transversely with respect to the longitudinal direction of the guide rail (30) and project past a level formed by the sliding section (34), and a plurality of support sections (32) follow the bevels (23.1) which rest against a plurality of profile sides (15.1, 15.2) of one of the associated vertical frame legs (11) and the horizontal frame legs (13).

24. In the switchgear cabinet in accordance with claim 1, wherein a plurality of vertical frame legs (11) and a plurality of horizontal frame legs (13) respectively have at least two first and second profile sides (15.1, 15.2 and 11.1, 12.1) facing a rack interior of the rack and extending at right angles to each other, wherein the first profile sides (15.1, 11.1) extend at right angles to an associated side of the rack, and the second profile sides (15.2, 12.2) extend parallel with the rack, and the guide rail (30) is inserted on one side into one of the first profile sides (15.1, 11.1) with the second positioning unit (35), and is fastened with an other end on one of the second profile sides (15.2, 12.1) of one of the associated vertical frame leg (11) and the horizontal frame leg (13).

* * * * *